United States Patent
Miyata et al.

(10) Patent No.: US 6,803,739 B2
(45) Date of Patent: Oct. 12, 2004

(54) METHOD AND APPARATUS FOR CONTROLLING SYNCHRONOUS MOTOR

(75) Inventors: Hideki Miyata, Okazaki (JP); Akira Hoshino, Nishikamo-gun (JP); Hideo Tomomatsu, Nagoya (JP); Masashi Hori, Nukata-gun (JP); Hiromichi Yamazaki, Hazu-gun (JP); Hitoshi Tanaka, Nagoya (JP)

(73) Assignees: Toyota Jidosha Kabushiki Kaisha, Toyota (JP); Nippon Soken, Inc., Nishio (JP); Denso Corporation, Kariya (JP)

(*) Notice: Subject to any disclaimer, the term of this patent is extended or adjusted under 35 U.S.C. 154(b) by 133 days.

(21) Appl. No.: 10/231,005

(22) Filed: Aug. 30, 2002

(65) Prior Publication Data

US 2003/0042863 A1 Mar. 6, 2003

(30) Foreign Application Priority Data

Sep. 4, 2001 (JP) ........................................ 2001-266802

(51) Int. Cl.⁷ .............................. H02P 1/46; H02P 3/18; H02P 5/28; H02P 7/36; H02P 7/04
(52) U.S. Cl. ........................ 318/700; 318/715; 318/433
(58) Field of Search ................................. 318/700, 715, 318/721, 432, 433, 434, 689, 13, 461

(56) References Cited

U.S. PATENT DOCUMENTS

| | | | |
|---|---|---|---|
| 4,734,633 A | * | 3/1988 | Ono et al. .................. 318/723 |
| 5,057,759 A | * | 10/1991 | Ueda et al. .................. 318/616 |
| 5,777,447 A | * | 7/1998 | Okano ........................ 318/434 |
| 6,462,492 B1 | * | 10/2002 | Sakamoto et al. .......... 318/254 |
| 6,555,988 B2 | * | 4/2003 | Masaki et al. .............. 318/721 |
| 6,674,261 B2 | * | 1/2004 | Takahashi et al. .......... 318/721 |

FOREIGN PATENT DOCUMENTS

| | | |
|---|---|---|
| JP | 63-245291 | 10/1988 |
| JP | 2-123997 | 5/1990 |
| JP | 8-163891 | 6/1996 |
| JP | 11346494 | 12/1999 |
| JP | 2001-86780 | 3/2001 |

* cited by examiner

Primary Examiner—Shih-Yung Hsieh
Assistant Examiner—Edgardo San Martin
(74) Attorney, Agent, or Firm—Oblon, Spivak, McClelland, Maier & Neustadt, P.C.

(57) ABSTRACT

A method and apparatus of controlling a synchronous motor having a rotor, and a stator which produces a magnetic flux for rotating the rotor about an axis thereof, the method including the steps of detecting an angular position and a rotating speed of the rotor; estimating a phase difference between a voltage and an electric current of the synchronous motor, on the basis of the detected rotating speed of the rotor; and adjusting an advance angle of the rotor upon excitation of the synchronous motor, as a result of comparison of the detected rotating speed of the rotor with a target value, to thereby control the rotating speed and direction of the rotor.

9 Claims, 10 Drawing Sheets

$N_{moku}$ : TARGET VALUE OF MOTOR ROTATING SPEED $N_{moku}$ : TARGET VALUE OF MOTOR ROTATING SPEED N' : ESTIMATED VALUE OF MOTOR ROTATING SPEED
OBTAINED BY STORED DATA MAP OR EQUATIONS

METHOD AND APPARATUS FOR CONTROLLING SYNCHRONOUS MOTOR

INCORPORATION BY REFERENCE

The disclosure of Japanese Patent Application No. 2001-266802 filed on Sep. 4, 2001, including the specification, drawings and abstract, is incorporated herein by reference in its entirety.

BACKGROUND OF THE INVENTION

1. Field of the Invention

The present invention relates to a method and an apparatus for controlling a synchronous motor which is suitably used to shift an automatic transmission.

2. Description of the Related Art

For shifting an automatic transmission according to an operation of a shift lever by an operator of an automotive vehicle, for instance, there is known a shifting apparatus which uses as a drive power source a synchronous motor such as a switched reluctance motor or a brushless DC motor.

Unlike a common shifting apparatus operated directly by an operating force applied by the operator to the shift lever to shift the automatic transmission, the shifting apparatus of the kind described above does not require a shifting mechanism to be mechanically connected to the shift lever, and is therefore free of restrictions in the arrangement of its components on the automotive vehicle, leading to a relatively high degree of freedom in its design. The shifting apparatus in question is further advantageous for its relatively easy installation on the automotive vehicle.

In the synchronous motor, the angular position of the rotor is detected by an angular position sensor mounted on the rotor shaft, and stator coils corresponding to the detected angular position of the rotor are energized or excited to rotate the rotor about the axis of the rotor shaft.

Generally, a synchronous motor is controlled by PWM (pulse-width modulation). However, the PWM control of the synchronous motor is difficult unless the resolution of the angular position sensor used to detect the angular position of the rotor is sufficiently high, and accordingly suffers from a problem that the angular position sensor is expensive. The PWM control controls an output voltage by changing a duty ratio of a pulse signal having a predetermined constant period, according to a level of an input signal.

It is also noted that an increase in the switching frequency causes a delay in the moment of initiation of a flow of an electric current through the coils within the synchronous motor, due to an influence of an inductance of the coils. This delay is caused by the characteristic of each coil in preventing a change in the voltage between the opposite ends of the coil. Due to this characteristic of the coil, an increase in the speed of switching the excitation phase of the motor above a certain value, as a result of an increase in the rotating speed of the synchronous motor, will cause a phase difference producing a certain time interval between the moment of initiation of the excitation of the coils and the moment of initiation of a flow of the electric current through the coils. To minimize this phase difference, the synchronous motor is generally controlled by so-called "vector control" which uses a speed sensor for detecting the rotating speed of the synchronous motor, and a current sensor for detecting an amount of delay in the moment of initiation of a flow of the electric current with respect to a switching action, to determine the advance angle of the synchronous motor upon excitation of the coils. In this vector control, the synchronous motor is controlled by controlling the amount of electric current by the PWM control or PAM (pulse-amplitude modulation) control.

However, the conventional vector control requires the control circuit to be provided with the current sensor, and current smoothing condenser and coils, which increases the number of required components, causing problems of increased constructional complexity, size and cost of manufacture of the control circuit. Thus, the known control apparatus for the synchronous motor is not suitably applicable to a system which is required to be inexpensive and small-sized.

SUMMARY OF THE INVENTION

The present invention was made to solve the problems described above. It is an object of the prevent invention to provide a method and an apparatus for controlling a synchronous motor, which permits effective reduction in the cost of manufacture and size of the control circuit.

Another object of the present invention is to provide a method and an apparatus for controlling the synchronous motor, which permit reduction of the number of required components and constructional simplification of the control circuit, and ensures increased durability and operating reliability of the control circuit.

A further object of the present invention is to provide a method and an apparatus for controlling the synchronous motor, which permits the synchronous motor to be controlled without the occurrence of an out-of-synchronization state, even in the presence of a variation in the load acting on the synchronous motor.

The objects indicated above may be achieved according to one aspect of this invention, which provides a method of controlling a synchronous motor having a rotor, and a stator which produces a magnetic flux for rotating the rotor about an axis thereof, the method comprising the steps of detecting an angular position and a rotating speed of the rotor; estimating a phase difference between a voltage and an electric current of the synchronous motor, on the basis of the detected rotating speed of the rotor; and adjusting an advance angle of the rotor upon excitation of the synchronous motor as a result of a comparison of the detected rotating speed of the rotor with a target value, to thereby control the rotating speed and direction of the rotor.

The rotating speed of the rotor can be represented by the advance angle, and the rotating speed and the advance angle have a relationship such that the rotating speed increases and decreases with the advance angle. Accordingly, the rotating speed of the rotor can be controlled to a target value, by reducing the advance angle when the actual rotating speed is higher than the target value, and increasing the advance angle when the actual rotating speed is lower than the target value. Therefore, the control circuit need not be provided with a current sensor and a current smoothing condenser and coils, and is therefore available at a lower cost with a reduced number of required components, and is small-sized. Further, the control circuit does not require an angular position sensor to have a high resolution. It is noted that synchronous motors of different types have different relationships between the rotating speed and advance angle of the rotor. To control the specific synchronous motor, therefore, the specific relationship must be obtained by experimentation, for example.

The above objects may also be achieved according to another aspect of this invention, which provides a method of controlling a synchronous motor having a rotor, and a stator which produces a magnetic flux for rotating the rotor about an axis thereof, the method comprising the steps of detecting an angular position and a rotating speed of the rotor; estimating a phase difference between a voltage and an electric current of the synchronous motor, on the basis of the detected rotating speed of the rotor; and adjusting an advance angle of the rotor upon excitation of the synchronous motor, as a result of a comparison of the detected rotating speed of the rotor with an estimated value, whereby the rotating speed and direction of the rotor are controlled.

In the control method for controlling the synchronous motor according to the second aspect of the invention, the angular position and rotating speed of the rotor of the synchronous motor are detected, and the phase difference between the voltage and electric current of the synchronous motor is estimated on the basis of the detected rotating speed of the rotor. Further, the estimated value of the rotating speed of the rotor is obtained according to the relationship between the detected rotating speed and the advance angle of the rotor which corresponds to the estimated phase difference. The detected rotating speed is compared with the thus obtained estimated value, to determine whether the output torque of the synchronous motor is larger or smaller than an optimum value. Thus, the advance angle of the rotor upon excitation of the synchronous motor can be adjusted, so that the synchronous motor can be controlled, without the occurrence of an out-of-synchronization state, even in the presence of a variation in the load acting on the synchronous motor. Therefore, the control circuit is need not be provided with a current sensor and a current smoothing condenser and coils, and is therefore available at a lower cost with a reduced number of required components, and is small-sized. Further, the control circuit does not require an angular position sensor to have a high resolution.

The objects indicated above may also be achieved according to a further aspect of this invention, which provides an apparatus for controlling a synchronous motor having a rotor, and a stator which produces a magnetic flux for rotating the rotor about an axis thereof, comprising a motor controller operable to control the synchronous motor, and an angular position detector operable to detect an angular position and a rotating speed of the rotor, and wherein the motor controller estimates a phase difference between a voltage and an electric current of the synchronous motor, on the basis of the rotating speed of the rotor detected by the angular position detector, and controls the rotating speed and direction of the rotor, by adjusting an advance angle of the rotor upon excitation of the synchronous motor.

In the apparatus according to the above-described aspect of the invention for controlling the synchronous motor, the motor controller estimates a phase difference between the voltage and electric current of the synchronous motor, on the basis of the rotating speed of the rotor detected by the angular position detector, and controls the rotating speed and direction of the rotor, by adjusting an advance angle of the rotor upon excitation of the synchronous motor. The rotating angle of the rotor can be represented by the advance angle of the rotor, and the rotating speed and the advance angle have a relationship that the rotating speed increases and decreases with the advance angle. Accordingly, the advance angle of the rotor upon excitation of the synchronous motor can be adjusted, by controlling the rotating speed of the rotor to a target value or an estimated value, as a result of comparison of the detected actual rotating speed of the rotor with the target value or the estimated value, or by taking into account the output torque of the synchronous motor obtained as a result of comparison of the detected actual rotating speed with the estimated value. Therefore, the control circuit need not be provided with a current sensor and a current smoothing condenser and coils, and is therefore available at a lower cost with a reduced number of required components, and is small-sized. Further, the control circuit does not require an angular position sensor to have a high resolution. It is noted that synchronous motors of different types have different relationships between the rotating speed and advance angle of the rotor. To control the specific synchronous motor, therefore, the specific relationship is required to be obtained by experimentation, for example.

BRIEF DESCRIPTION OF THE DRAWINGS

The above and other objects, features, advantages, and technical and industrial significance of this invention will be better understood by reading the following detailed description of preferred embodiments of the invention, when considered in connection with the accompanying drawings, in which.

DETAILED DESCRIPTION OF EXEMPLARY EMBODIMENTS

In the following description and the accompanying drawings, the present invention will be described in more detail in terms of exemplary embodiments.

First Embodiment

Figure 2:
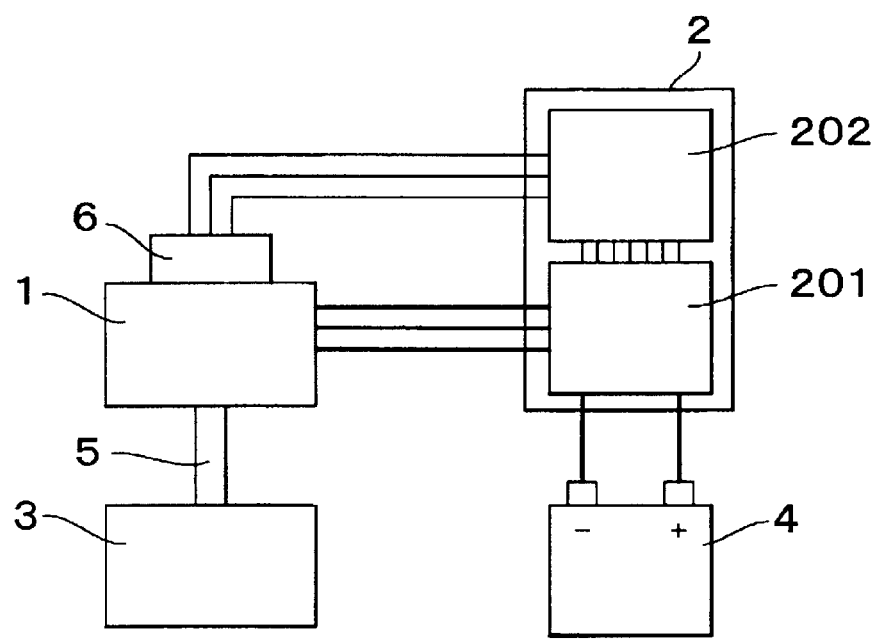
FIG. 2 is a system configuration illustrating a control apparatus according to the first embodiment for controlling the synchronous motor.

Referring to the block diagram of FIG. 2, there is illustrated an arrangement of a system incorporating a control apparatus according to a first embodiment of this invention, for controlling a synchronous motor as applied to a shifting apparatus for shifting an automatic transmission on an automotive vehicle.

As shown in FIG. 2, the system includes a synchronous motor 1, a motor control circuit 2, a load 3 having a mechanical detent mechanism, and an angular position sensor 6 of incremental encoder type. The motor control circuit 2 and the angular position sensor 6 cooperate to constitute the control apparatus for controlling the synchronous motor 1. The synchronous motor 1 and the load 3 are directly connected to each other through a shaft 5.

The motor control circuit 2 consists of motor controlling means in the form of a motor control portion 201, and a counter portion 202, and is operated by electric power supplied from a battery 4. The motor control portion 201 includes output stages (not shown) for controlling the excitation of a U phase, a V phase and a W phase of the synchronous motor 1. The detent mechanism (not shown) incorporated within the load 3 is arranged to shift the automatic transmission to a selected one of its operating positions: a parking position (P); a reverse position (R); a neutral position (N); a drive position (D); a second position (2); and a low position (L). The angular position sensor 6 serves as an angular-position detecting means for generating an output in the form of pulses according to a rotating action of a rotor 102 (shown in FIG. 3) of the synchronous motor 1, while the counter portion 202 counts the number of the output pulses per unit time. An output of the counter portion 202, which represents the angular position and rotating speed of the rotor 102 of the synchronous motor 1, is applied to the motor control portion 201. The angular position and rotating speed of the rotor 102 of the synchronous motor 1 represent the presently established operating position of the automatic transmission. When the motor control portion 201 receives the output of the counter portion 201, the motor control portion checks if the presently established operating position represented by the output of the counter portion 202 coincides with the operating position represented by an output signal of a shift switch (not shown). The motor control portion 201 controls the synchronous motor 1 so that the presently established operating position coincides with the operating position represented by the output signal of the shift switch, namely, so that the automatic transmission is shifted to its operating position represented by the output signal of the shift switch.

Figure 3:
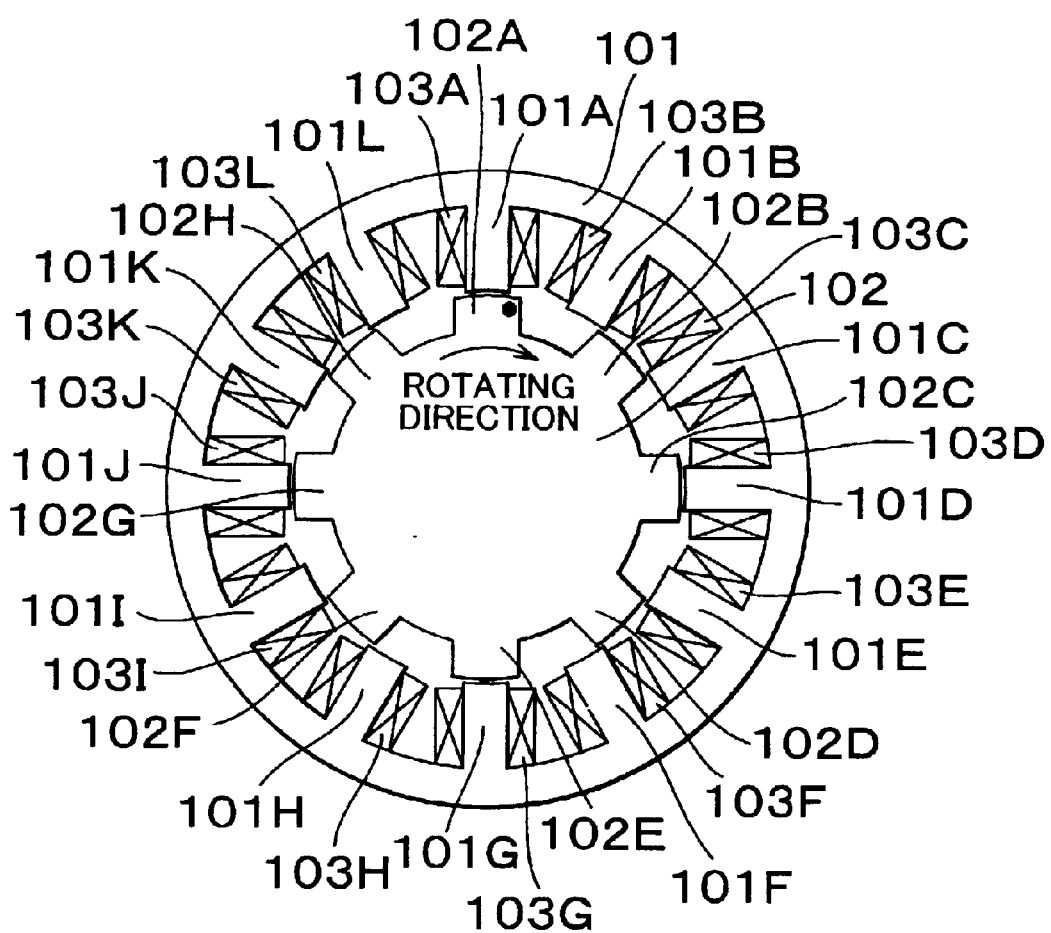
FIG. 3 is a plan view of the synchronous motor in the first embodiment, taken in its axial direction.

As shown in FIG. 3, the synchronous motor 1 is a switched reluctance motor including a stator 101 and the above-indicated rotor 102. With a magnetic flux produced by the stator 101, the rotor 102 is rotated about an axis of rotation of the shaft 5 (shown in FIG. 2). The stator 101 has twelve (12) teeth 101A–101L which protrude radially inwardly toward the axis of the rotor 102 and which are spaced from each other at an angular spacing interval or pitch of 30°. Coils 103A–103L are wound on the respective teeth 101A–101L. The rotor 102 is supported rotatably and coaxially with the stator 101, and has eight (8) salient poles 102A–102H which protrude radially outwardly toward the stator 101 and which are spaced from each other at an angular spacing interval or pitch of 45°. The coils 103A, 103D, 103G and 103J are connected to the U-phase output stage of the motor control portion 201 (FIG. 2), and the coils 103B, 103E, 103H and 103K are connected to the V-phase output stage, while the coils 103C, 103F, 103I and 103L are connected to the W-phase output stage.

In the synchronous motor 1 constructed as described above, the rotor 102 is rotatable bidirectionally or in a selected one of the opposite directions and can be held at a desired angular position, by controlling the excitation currents to be applied to the U-phase coils 103A, D, G and J, the V-phase coils 103B, E, H and K and the W-phase coils 103C, F, I and L.

Figure 4:
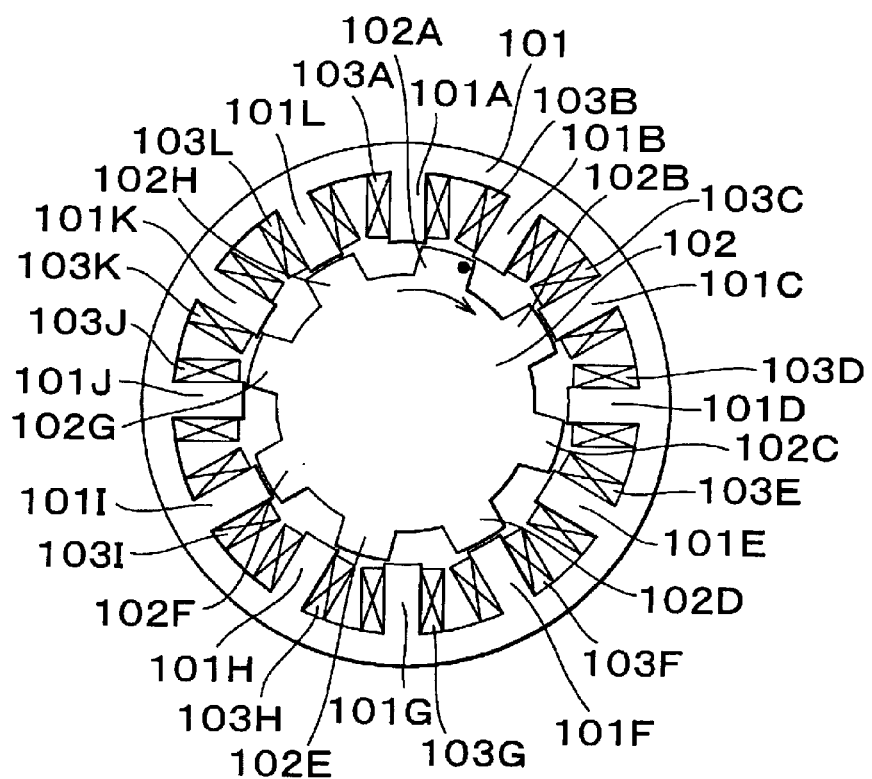
FIG. 4 is a plan view showing the synchronous motor in an operating state in which the rotor has rotated 15.degree. in the clockwise direction from the position of FIG. 3.
Figure 5:
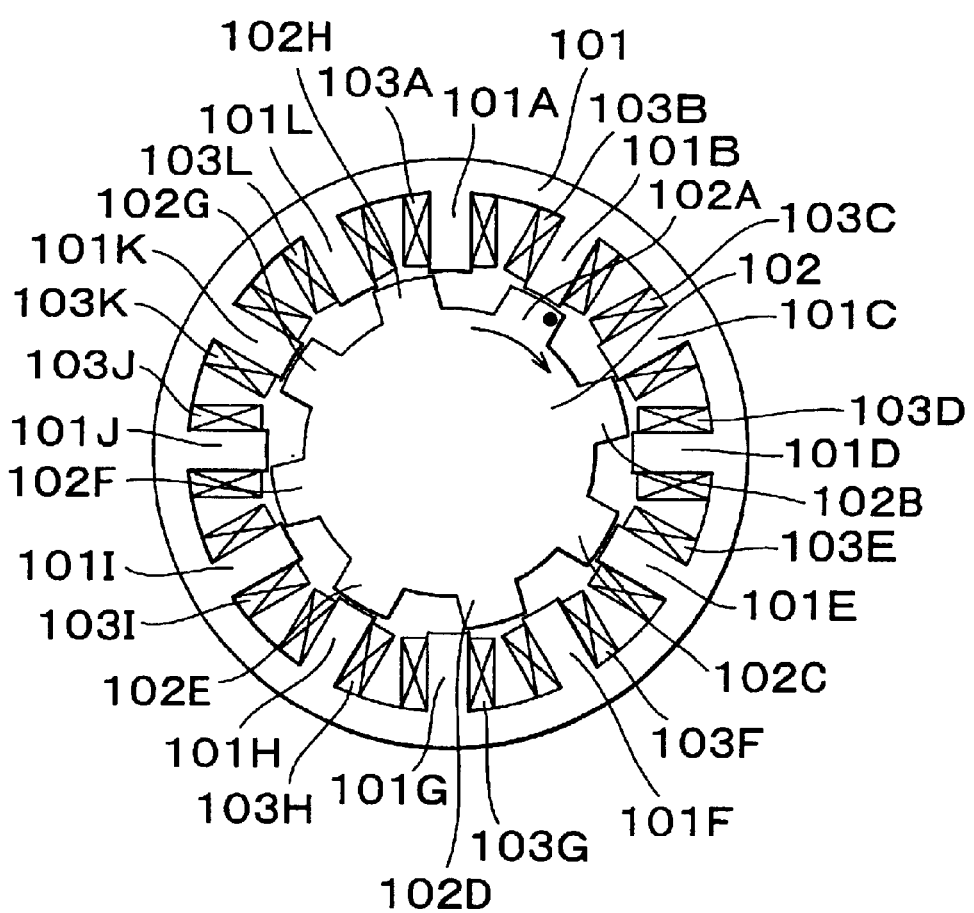
FIG. 5 is a plan view showing the synchronous motor in an operating state in which the rotor has rotated 15.degree. in the clockwise direction from the position of FIG. 4.
Figure 6:
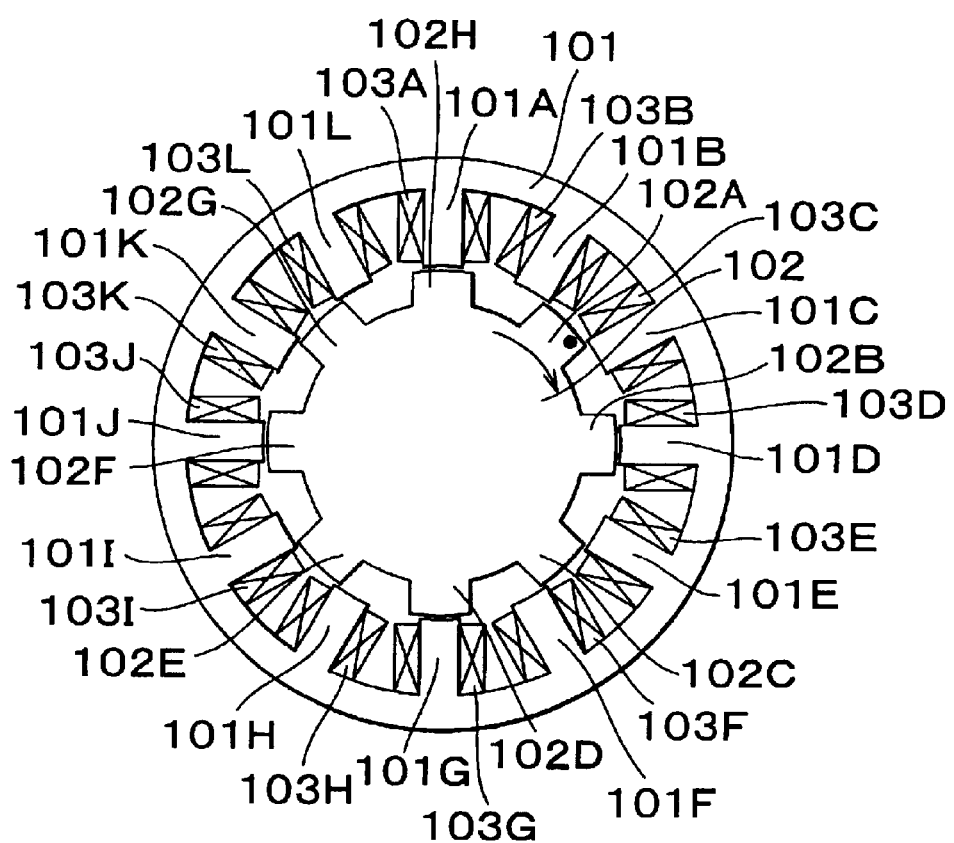
FIG. 6 is a plan view showing the synchronous motor in an operating state in which the rotor has rotated 15.degree. in the clockwise direction from the position of FIG. 5.
Figure 7:
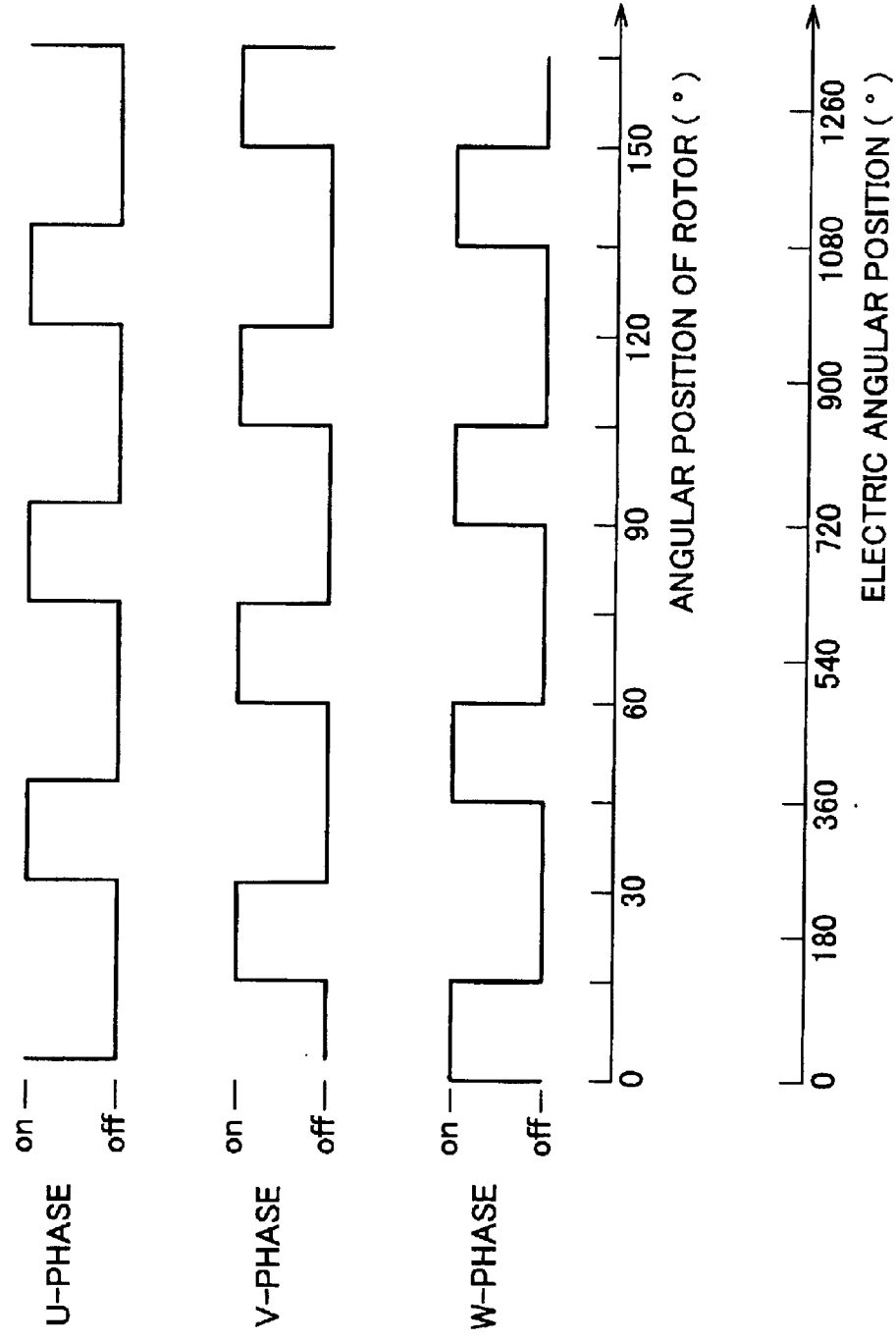
FIG. 7 is a view indicating excitation phases of coils in relation to an angular position of the rotor when rotated in the clockwise direction in the synchronous motor in the first embodiment of the invention.

In the specific example, an angular position of the rotor 102 relative to the stator 101 shown in FIG. 3 is defined as an angular position of 0° as indicated in FIG. 7. A rotary motion of the rotor 102 in the clockwise direction will be described. When the W-phase coils, that is, the coils 103C, 103F, 103I and 103L, are excited or energized in the operating state of FIG. 3, a force of attraction is produced between each of the corresponding teeth 101C, 101F, 101I and 101L of the stator 101 and the corresponding ones of the salient poles 102B, 102D, 102F and 102H of the rotor 102. The force of attraction causes the rotor 102 to be rotated in the clockwise direction to an angular position of FIG. 4 (angular position of 15°). When the V-phase coils are excited in the operating state of FIG. 4, the rotor 102 is similarly rotated to an angular position of FIG. 5 (angular position of 30°). When the U-phase coils are excited in the operating state of FIG. 5, the rotor 102 is similarly rotated to an angular position of FIG. 6 (angular position of 45°). Thus, the rotor 102 can be rotated, that is, the synchronous motor 1 can be operated, by exciting an appropriate one of the three sets of the coils 103A–103L corresponding to the U, V and W phases, depending upon the present angular position of the rotor 102. FIG. 7 indicates the excited coils of the U, V and W phases in relation to the angular position of the rotor 102 when the rotor 102 is rotated in the clockwise direction.

Figure 1:
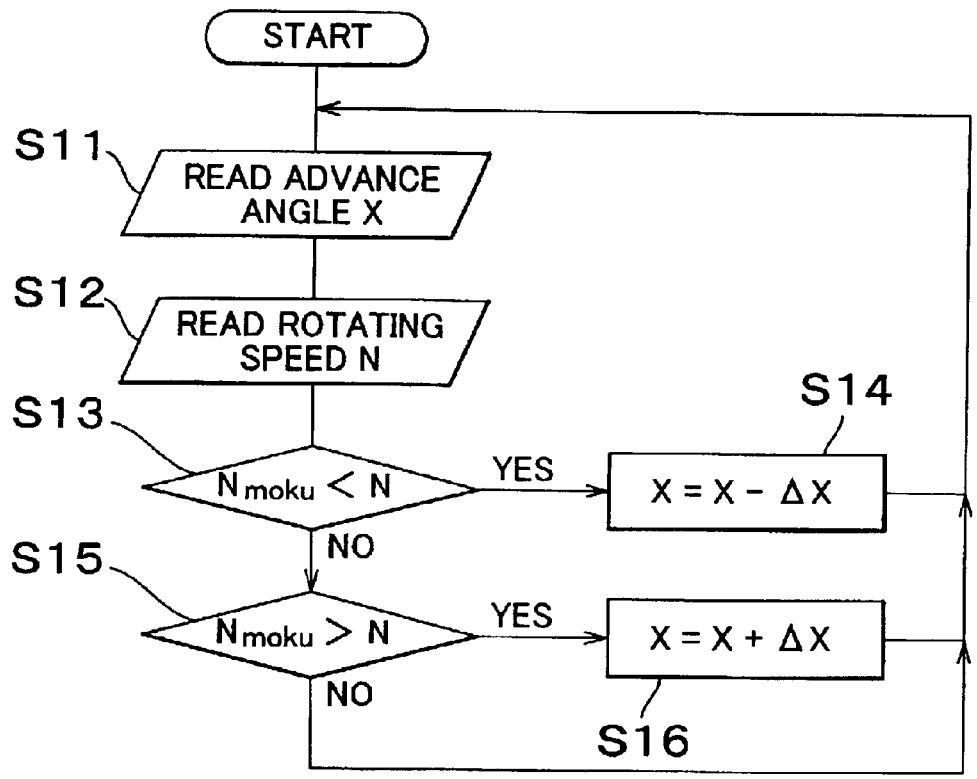
FIG. 1 is a flow chart for explaining a method of controlling a synchronous motor, according to a first embodiment of the present invention.
Figure 8:
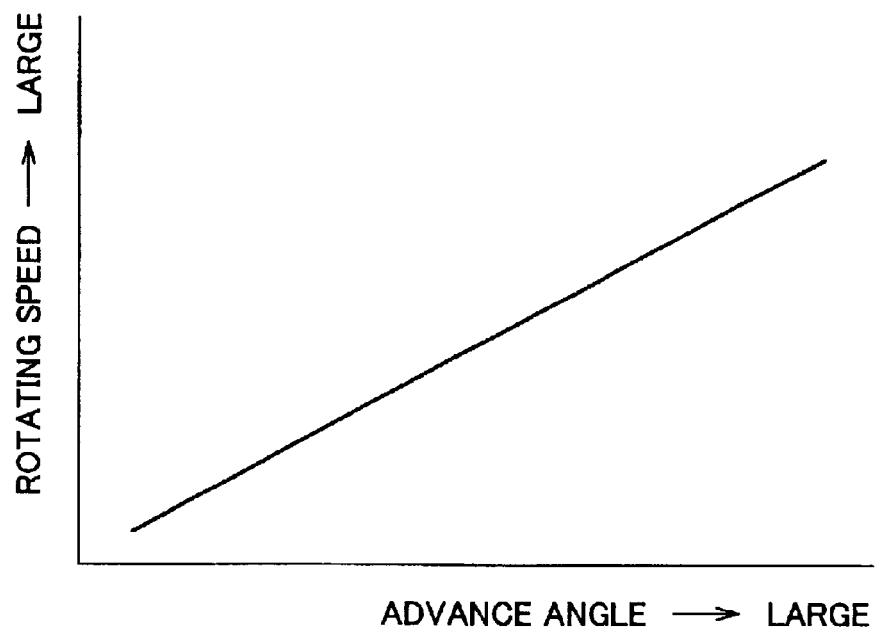
FIG. 8 is a graph indicating a relationship between the advance angle and rotating speed of the synchronous motor in the first embodiment.

Referring next to FIGS. 1 and 8, there will be described an operation of the control apparatus for the synchronous motor 1 constructed and operated as described above.

When an engine of the vehicle is turned on by the vehicle operator, the motor control circuit 2 is supplied with electric power from the battery 4, and the output signal of the shift switch representative of the selected operating position of the automatic transmission is applied to the motor control circuit 2. The motor control portion 201 controls the synchronous motor 1 such that the rotor 102 is rotated to the angular position corresponding to the selected operating position of the automatic transmission as represented by the output signal of the shift switch. As a result, the detent mechanism within the load 3 is operated by the thus operated synchronous motor 1, to shift the automatic transmission to the selected operating position (one of the positions P, R, N, D, 2 and L).

The angular position sensor 6 generates pulses according to the rotation of the rotor 102 of the synchronous motor 1, and the counter portion 202 counts the number of the generated pulses and supplies an output representative of the angular position and rotating speed of the rotor 102 of the synchronous motor 1 to the motor control portion 201. The motor control portion 201 determines whether the presently established operating position of the automatic transmission represented by the angular position and rotating speed of the rotor 102 of the synchronous motor 1 coincides with the operating position represented by the output signal of the shift switch. The motor control portion 201 controls the synchronous motor 1 so that the automatic transmission is shifted to the operating position represented by the output signal of the shift switch.

Described more specifically, the motor control portion 201 estimates a phase difference between the voltage and the electric current of the coils 103A–103L, on the basis of the rotating speed detected by the angular position sensor 6, and adjusts the advance angle of the synchronous motor 1 upon excitation or energization of the coils 103A–103L, to thereby control the rotating speed and direction of the synchronous motor 1. As indicated in FIG. 8, the rotating speed of the synchronous motor 1 is linearly proportional with, and can therefore be represented by, the advance angle. Namely, the rotating speed and the advance angle have a relationship that the rotating speed increases and decreases with the advance angle. In view of this, a nominal relationship between the rotating speed and advance angle of the synchronous motor 1 is obtained by experimentation, for example, and the obtained nominal relationship is stored in a memory of the motor control circuit 1. This nominal relationship stored in the memory is used to adjust the advance angle on the basis of the detected rotating speed of the rotor 102, as described below in detail by reference to the flow chart of FIG. 1.

A control routine of FIG. 1 is initiated with step S11 to read the present advance angle X. Then, the control flow goes to step S12 to read the presently detected actual rotating speed N. Then, step S13 is implemented to determine whether the detected actual rotating speed N is higher than a target value $N_{moku}$ which is obtained on the basis of the present advance angle X and according to the stored nominal X-N relationship. If the actual rotating speed N is higher than the target value $N_{moku}$, the control flow goes to step S14 in which the actual advance angle X is reduced by a predetermined amount $\Delta X$. If the actual rotating speed N is lower than the target value $N_{moku}$, an affirmative decision (YES) is obtained in step S15, and the control flow goes to step S16 in which the actual advance angle X is increased by the predetermined amount $\Delta X$. With the control routine of FIG. 1 being repeatedly executed, the actual rotating speed N of the synchronous motor 1 can be eventually controlled to the target value $N_{moku}$.

The first embodiment of the present invention described above does not require the motor control circuit 2 to be provided with a current sensor and a current smoothing condenser and coils, and permits a significant reduction of the cost of manufacture and the size of the motor control circuit, with a reduced number of the required components and simple construction of the motor control circuit, thereby assuring improved durability and operating reliability of the motor control apparatus. Further, the present motor control apparatus does not require the angular position sensor 6 to have a high resolution, and is therefore available at a reduced cost.

Second Embodiment

Figure 9:
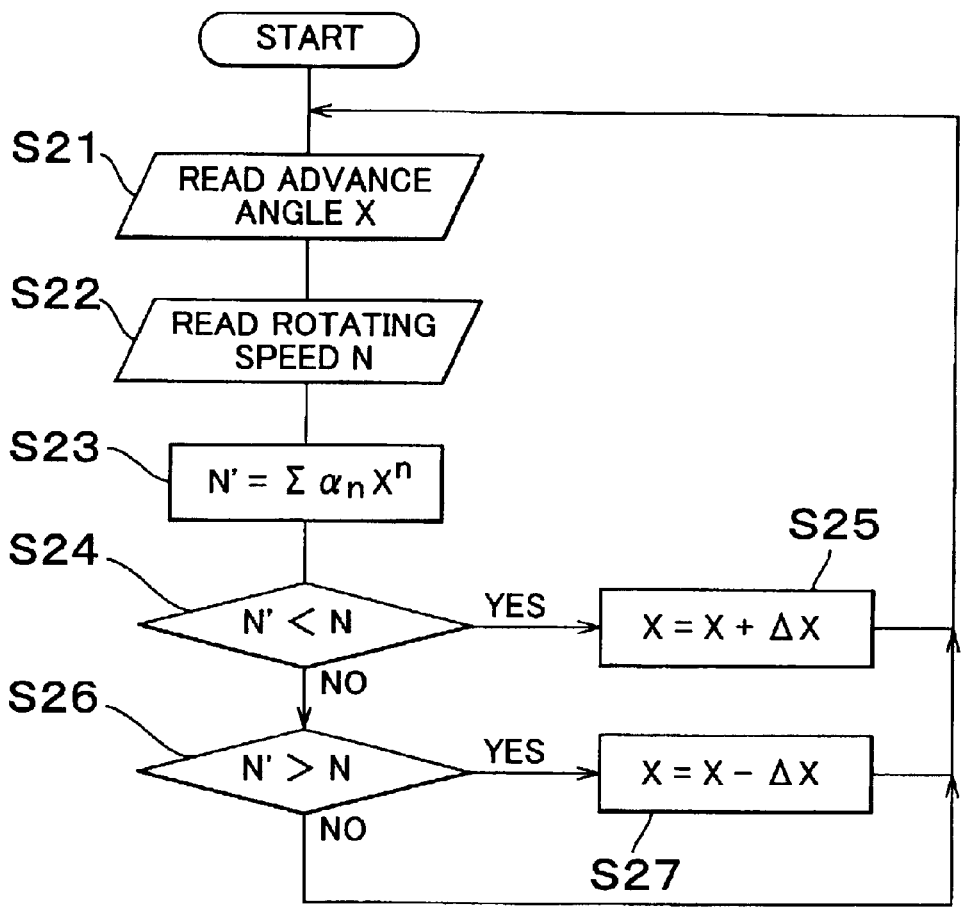
FIG. 9 is a flow chart for explaining a method of controlling a synchronous motor, according to a second embodiment of this invention.

A second embodiment of the present invention is shown in FIG. 9. A system including the control apparatus according to this second embodiment is similar to that of the first embodiment shown in FIG. 2, and redundant description of the system will not be provided.

Figure 10:
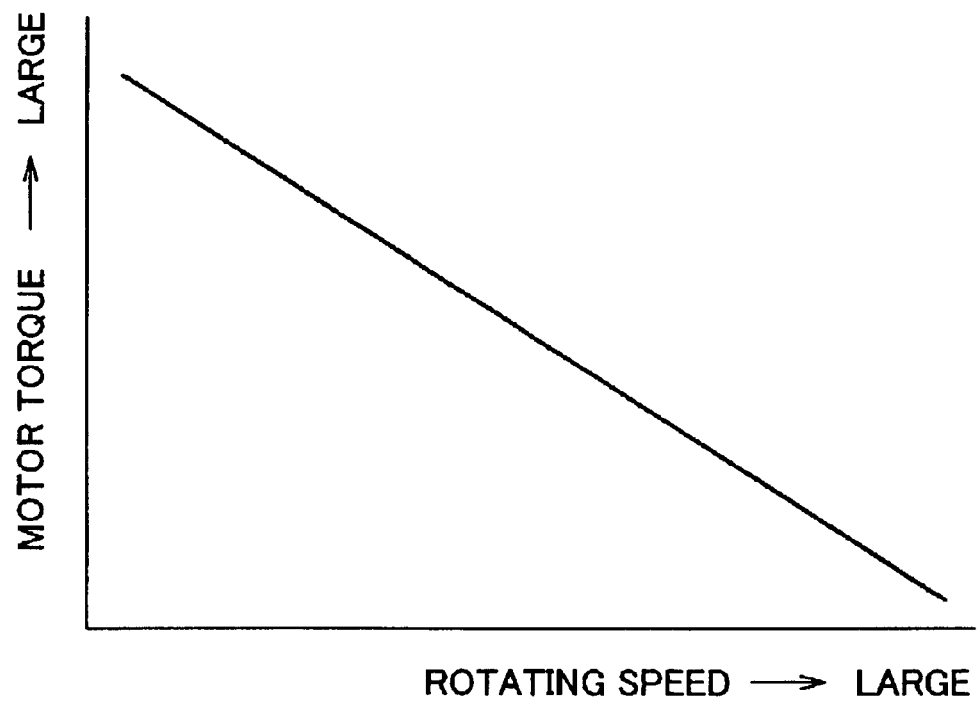
FIG. 10 is a graph indicating a relationship between the speed and torque of the synchronous motor in the second embodiment of the invention.

Referring to FIGS. 9 and 10, there will be described only the aspects of the method of controlling the synchronous motor 1 according to the second embodiment which are different from the first embodiment.

The motor control portion 201 estimates a phase difference between the voltage and the electric current, on the basis of the rotating speed detected by the angular position sensor 6. Then, the motor control portion 201 determines whether the output torque of the synchronous motor 1 is larger or smaller than an optimum value, according to a predetermined relationship between the rotating speed of the motor and the advance angle of the motor which corresponds to the estimated phase difference. The motor control portion 201 is arranged to reduce the advance angle if the output torque of the synchronous motor 1 is determined to be smaller than the optimum value.

If the output torque is determined to be larger than the optimum value, the motor control portion 201 increases the advance angle. As described above with respect to the first embodiment, the rotating speed of the synchronous motor 1 can be represented by the advance angle, that is, the rotating speed increases and decreases with the advance angle. There is also a predetermined relationship between the output torque and rotating speed of the synchronous motor 1, as shown in FIG. 10. That is, the output torque decreases with an increase of the rotating speed, and increases with a decrease of the rotating speed. A control routine of FIG. 9 is initiated with step S21 to read the present advance angle X. Then, step S22 is implemented to read the presently detected actual rotating speed N. Then, the control flow goes to step S23 to obtain an estimated value N' of the rotating speed N, according to the following equation (1):

$$N' = \Sigma \alpha_n X^n \qquad (1),$$

where N' is an estimated value of the rotating speed N obtained by store data map or equations, $X^n$ is an advance angle and $\alpha_n$ is a coefficient.

The estimated value N' may be obtained according to a stored data map or equations.

Then, the control flow goes to step S24 to determine whether the actual rotating speed N detected by the angular position sensor 6 is higher than the obtained estimated value N'. If the actual rotating speed N is higher than the estimated value N', this means that the output torque is larger than the optimum value. In this case, the control flow goes to step S25 in which the advance angle X is increased by a predetermined amount $\Delta X$, to increase the actual rotating speed N. If the actual rotating speed N is lower than the estimated value N', this means that the output torque is smaller than the optimum value. In this case, an affirmative decision (YES) is obtained in step S26, and the control flow goes to step S27 in which the actual advance angle X is reduced by the predetermined amount $\Delta X$, to reduce the actual rotating speed N. With the control routine of FIG. 9 being repeatedly executed, the output torque of the synchronous motor 1 can be eventually controlled to the optimum value, without an occurrence of an out-of-synchronization state, even in the presence of a variation in the load acting on the synchronous motor 1.

The second embodiment described above has substantially the same advantages as the first embodiment shown in FIG. 1.

Although the synchronous motor 1 controlled according to the first and second embodiments of this invention is a switched reluctance motor, the principle of the invention is equally applicable to a synchronous motor of any other types, such as a brushless DC motor.

In the illustrated embodiments, the synchronous motor 1 is used to operate the shifting apparatus for shifting the automatic transmission, the control apparatus and method according to the present invention are equally applicable to a synchronous motor used for any other devices and equipment, such as industrial machines and equipment and household electric appliance.

While the invention has been described with reference to preferred embodiments thereof, it is to be understood that the present invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the sprint and scope of the invention.

What is claimed is:

1. A method of controlling a synchronous motor having a rotor, and a stator which produces a magnetic flux for rotating said rotor about an axis thereof, said method comprising the steps of:

detecting an angular position and a rotating speed of said rotor;

estimating a phase difference between a voltage and an electric current of said synchronous motor, on the basis of the detected rotating speed of said rotor; and adjusting an advance angle of said rotor upon excitation of the synchronous motor, as a result of a comparison of the detected rotating speed of said rotor with a target value, to thereby control the rotating speed and direction of said rotor, wherein said step of adjusting an advance angle of said rotor comprises reducing said advance angle when the detected rotating speed of said rotor is higher than said target value, and increasing said advance angle when the detected rotating speed is lower than said target value.

2. A method according to claim 1, wherein said step of adjusting an advance angle of said rotor comprises reducing said advance angle by a predetermined amount when the detected rotating speed of said rotor is higher than said target value, and increasing said advance angle by a predetermined amount when the detected rotating speed is lower than said target value.

3. A method of controlling a synchronous motor having a rotor, and a stator which produces a magnetic flux for rotating said rotor about an axis thereof, said method comprising the steps of:

detecting an angular position and a rotating speed of said rotor;

estimating a phase difference between a voltage and an electric current of said synchronous motor, on the basis of the detected rotating speed of said rotor; and adjusting an advance angle of said rotor upon excitation of the synchronous motor, as a result of a comparison of the detected rotating speed of said rotor with an estimated value, whereby the rotating speed and direction of said rotor are controlled, wherein said step of adjusting an advance angle of said rotor comprises determining whether an output torque of the synchronous motor is larger or smaller than an optimum value, by comparing said detected rotating speed of the rotor with said optimum value, and adjusting the advance angle depending upon whether said output torque is larger or smaller than said optimum value, and wherein said step of adjusting an advance angle of said rotor further comprises reducing said advance angle when it is determined that said output torque is smaller than said optimum value, and increasing said advance angle when it is determined that said output torque is larger than said optimum value.

4. A method according to claim 3, wherein said estimated value of the rotating speed is estimated on the basis of the advance angle which corresponds to the estimated phase difference.

5. A method according to claim 3, wherein said step of adjusting an advance angle of said rotor comprises reducing said advance angle by a predetermined amount when said detected rotating speed of said rotor is lower than said estimated value, and increasing said advance angle by a predetermined amount when said detected rotating speed of said rotor is higher than said estimated value.

6. An apparatus for controlling a synchronous motor having a rotor, and a stator which produces a magnetic flux for rotating said rotor about an axis thereof, comprising:

a motor controller operable to control said synchronous motor; and an angular position detector operable to detect an angular position and a rotating speed of said rotor, and wherein said motor controller is adapted and configured to estimate a phase difference between a voltage and an electric current of said synchronous motor, on the basis of the rotating speed of said rotor detected by said angular position detector, and to control the rotating speed and direction of said rotor, by adjusting an advance angle of said rotor upon excitation of the synchronous motor, wherein said motor controller is adapted and configured to adjust said advance angle of said rotor, as a result of comparison of the detected rotating speed of said rotor with a target value, to thereby control the rotating speed and direction of said rotor, and wherein said motor controller is adapted and configured to reduce said advance angle when the detected rotating speed of said rotor is higher than said target value, and to increase said advance angle when the detected rotating speed is lower than said target value.

7. An apparatus according to claim 6, wherein said motor controller is adapted and configured to reduce said advance angle by a predetermined amount when the detected rotating speed of said rotor is higher than said target value, and to increase said advance angle by a predetermined amount when the detected rotating speed is lower than said target value.

8. An apparatus for controlling a synchronous motor having a rotor, and a stator which produces a magnetic flux for rotating said rotor about an axis thereof, comprising:

a motor controller operable to control said synchronous motor; and an angular position detector operable to detect an angular position and a rotating speed of said rotor, and wherein said motor controller is adapted and configured to estimate a phase difference between a voltage and an electric current of said synchronous motor, on the basis of the rotating speed of said rotor detected by said angular position detector, and to control the rotating speed and direction of said rotor, by adjusting an advance angle of said rotor upon excitation of the synchronous motor, wherein said motor controller is adapted and configured to adjust said advance angle of said rotor, as a result of a comparison of the detected rotating speed of said rotor with an estimated value, whereby the rotating speed and direction of said rotor are controlled, wherein said motor controller estimates said estimated value of the rotating speed on the basis of the advance angle which corresponds to the estimated phase difference, wherein said motor controller is adapted and configured to determine whether an output torque of the synchronous motor is larger or smaller than an optimum value, by comparing said detected rotating speed of the rotor with said estimated value, and to adjust the advance angle depending upon whether said output torque is larger or smaller than said optimum value, and wherein said motor controller is adapted and configured to reduce said advance angle when it is determined that said output torque is smaller than said optimum value, and to increase said advance angle when it is determined that said output torque is larger than said optimum value.

9. An apparatus according to claim 8, wherein said motor controller is adapted and configured to reduce said advance angle by a predetermined amount when said detected rotating speed of said rotor is lower than said estimated value, and to increase said advance angle by a predetermined amount when said detected rotating speed of said rotor is higher than said estimated value.

* * * * *